T. HOADLEY.
THREE-HORSE EQUALIZER.

No. 183,396. Patented Oct. 17, 1876.

Witnesses
Clarence Thurlow
Alex. Sefton

Inventor,
Thomas Hoadley
by E. Thurlow,
his atty in fact

UNITED STATES PATENT OFFICE.

THOMAS HOADLEY, OF TOULON, ILLINOIS, ASSIGNOR OF ONE-HALF HIS RIGHT TO WILLIAM M. LOWMAN, OF SAME PLACE.

IMPROVEMENT IN THREE-HORSE EQUALIZERS.

Specification forming part of Letters Patent No. 183,396, dated October 17, 1876; application filed August 14, 1876.

*To all whom it may concern:*

Be it known that I, THOMAS HOADLEY, of Toulon, in the county of Stark and in the State of Illinois, have invented an Improvement in Three-Horse Equalizers, (Triple-Tree;) and do hereby declare that the following is a full, clear, and exact description thereof, reference being had to the annexed drawings, making a part of this specification, in which like letters of reference refer to like parts, and in which—

Figure 1:
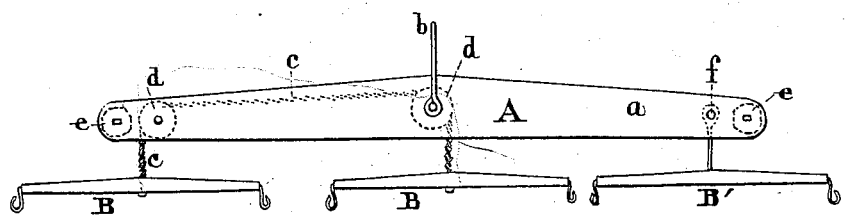
Figure 2:
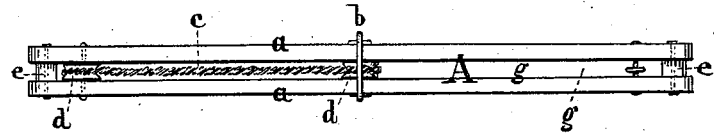

Figure 1 represents a superficial view; Fig. 2, an edge view, showing the pulleys, &c.

This invention consists of a triple-tree, in which two horses pull and are balanced in draft against each other and against the third horse by means of a running chain or rope, each end of which is attached to a separate single-tree belonging to adjoining horses, and passing behind pulleys, one placed behind the clevis, at the center of the triple-tree, the other at the end of the latter; the other end receives the third single-tree by means of ordinary attachment or short hook, bolt, &c., $f$, all the points of draft upon the triple-tree being placed at equal distances apart.

In the drawings, which represent the form in which I construct my triple-tree, A A represent the two parallel bars of the same, so attached together with interposed blocks $e\ e$ as to leave a space, $g$, between them, to admit the pulleys $d\ d$, one in the center behind the clevis $b$, the other at one end of the triple-tree, over which pulleys the chain or rope $c$ passes to the single-trees B B, the third single-tree B' being attached directly to the remaining end of the triple-tree at the draft-point $f$.

The operation of this triple-tree is as follows: The pulleys $d\ d$ and the draft-point $f$ being at equal distances along the triple-tree A, the chain $c$, connecting behind the pulleys the center and outside horse, equalizes the draft.

What I claim as my invention is—

1. The bars A A, pulleys $d\ d$, chain or rope $c$, connected with single-trees B B, arranged to balance the third single-tree B, substantially as described.

2. The combination, with the triple-tree A, of pulleys $d\ d$, chain or rope $c$, for the attachment of the single-trees B B, as constructed and arranged.

3. The triple-tree A, single-tree B', pulleys $d\ d$, chain or rope $c$, and single-trees B B, combined and arranged as and for the purposes described.

In testimony that I claim the foregoing triple-tree I have hereunto set my hand this 17th day of July, A. D. 1876.

THOMAS HOADLEY.

Witnesses:
WM. CHAMBERLAIN,
WM. M. LOWMAN.